(12) United States Patent
Dolinsky et al.

(10) Patent No.: US 9,541,656 B2
(45) Date of Patent: Jan. 10, 2017

(54) SYSTEM AND METHOD FOR COMPENSATING TEMPERATURE GAIN VARIATION IN RADIATION DETECTORS

(71) Applicant: GENERAL ELECTRIC COMPANY, Schenectady, NY (US)

(72) Inventors: Sergei Ivanovich Dolinsky, Clifton Park, NY (US); David Leo McDaniel, Dousman, WI (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 14/136,667

(22) Filed: Dec. 20, 2013

(65) Prior Publication Data

US 2015/0177394 A1   Jun. 25, 2015

(51) Int. Cl.
 G01D 18/00  (2006.01)
 G01T 7/00   (2006.01)
 G01T 1/208  (2006.01)

(52) U.S. Cl.
 CPC .............. G01T 7/005 (2013.01); G01T 1/208 (2013.01)

(58) Field of Classification Search
 CPC ..................................... A61B 6/582
 USPC ..................................... 250/252.1
 See application file for complete search history.

(56) References Cited

U.S. PATENT DOCUMENTS

| 7,140,766 | B2* | 11/2006 | Glukhovsky | ............ A61B 1/04 374/121 |
| 7,157,681 | B1 | 1/2007 | Tetzlaff | |
| 7,403,589 | B1 | 7/2008 | Short et al. | |
| 8,008,623 | B2 | 8/2011 | Stein et al. | |
| 2004/0129863 | A1* | 7/2004 | Cheung et al. | ........... 250/214 C |
| 2010/0065746 | A1 | 3/2010 | Grazioso et al. | |
| 2010/0301194 | A1* | 12/2010 | Patel | ........................ G01J 1/18 250/208.2 |
| 2010/0316184 | A1 | 12/2010 | Iwanczyk et al. | |
| 2011/0198504 | A1 | 8/2011 | Eigen | |
| 2011/0248175 | A1* | 10/2011 | Frach et al. | ............. 250/363.03 |
| 2011/0291017 | A1 | 12/2011 | Frach | |

OTHER PUBLICATIONS

Kaplan, Alexander, et al.; "Correction of Voltage and Temperature Dependence of Silicon-Photomultipliers", CALICE, pp. 1-16, Jun. 18, 2008.

Gil, A, et al.; "Programmable power supply system for SiPM bias", 2011 IEEE Nuclear Science Symposium and Medical Imaging Conference (NSS/MIC), pp. 787-790, Oct. 2011.

(Continued)

*Primary Examiner* — David Porta
*Assistant Examiner* — Edwin Gunberg
(74) *Attorney, Agent, or Firm* — Robert M. McCarthy

(57) ABSTRACT

In accordance with the present approach, a dark current is measured for one or more detector elements and used to determine a gain or gain compensation for the respective detector elements. In certain embodiments, the dark current is used to determine a temperature for the respective detector element and the temperature is used to determine the gain or gain compensation. In other embodiments, the dark current is used to calculate the gain or gain compensation for the respective detector element without calculating an intermediate temperature value, such as via the use of a transfer function.

23 Claims, 10 Drawing Sheets

(56) References Cited

OTHER PUBLICATIONS

Yoon, Hyun Suk, et al.; "Initial Results of Simultaneous PET/MRI Experiments with an MRI-Compatible Silicon Photomultiplier PET Scanner", The Journal of Nuclear Medicine, pp. 608-614, vol. 53, Issue 4, Apr. 1, 2012.

Li, Zhengwei, et al.; "A Gain Control and Stabilization Technique for Silicon Photomultipliers in Low-Light-Level Applications Around Room Temperature", Nuclear Instruments and Methods in Physics Research Section A Accelerators, Spectrometers Detectors and Associated Equipment, pp. 222-256, vol. 695, Dec. 11, 2012.

* cited by examiner

SYSTEM AND METHOD FOR COMPENSATING TEMPERATURE GAIN VARIATION IN RADIATION DETECTORS

BACKGROUND

The subject matter disclosed herein relates to detection systems for use in imaging systems, such as X-ray based and nuclear medicine imaging systems.

Diagnostic imaging technologies allow images of the internal structures of a patient to be obtained and may provide information about the function and integrity of the patient's internal structures. Diagnostic imaging systems may operate based on various physical principles, including the emission or transmission of radiation from the patient tissues. For example, X-ray based imaging systems may direct X-rays at a patient from some emission source toward a detector system disposed opposite the source across an imaged volume. Attenuation of the X-rays as they pass through the volume, and through any materials or tissues placed between the source and detector, may be determined and used to non-invasively form images of the interior regions of an imaged patient or object. Such attenuation information may be obtained at various angular displacements to generate depth information coincident with the attenuation information.

In addition, single photon emission computed tomography (SPECT) and positron emission tomography (PET) may utilize a radiopharmaceutical that is administered to a patient and whose breakdown results in the emission of gamma rays from locations within the patient's body. The radiopharmaceutical is typically selected so as to be preferentially or differentially distributed in the body based on the physiological or biochemical processes in the body. For example, a radiopharmaceutical may be selected that is preferentially processed or taken up by tumor tissue. In such an example, the radiopharmaceutical will typically be disposed in greater concentrations around tumor tissue within the patient.

In the context of PET imaging, the radiopharmaceutical typically breaks down or decays within the patient, releasing a positron which annihilates when encountering an electron and produces a pair of gamma rays moving in opposite directions in the process. In SPECT imaging, a single gamma ray is generated when the radiopharmaceutical breaks down or decays within the patient. These gamma rays interact with detection mechanisms within the respective PET or SPECT scanner, which allow the decay events to be localized, thereby providing a view of where the radiopharmaceutical is distributed throughout the patient. In this manner, a caregiver can visualize where in the patient the radiopharmaceutical is disproportionately distributed and may thereby identify where physiological structures and/or biochemical processes of diagnostic significance are located within the patient.

In the above examples of imaging technologies, a detector is employed which converts incident radiation to useful electrical signals that can be used in image formation. Certain such detector technologies employ silicon photomultipliers, which may be useful for detecting optical signals generated in a scintillator in response to the incident radiation. One issue that may arise is that, in certain detector technologies where silicon photomultipliers are employed, the gain of the respective detection elements may be temperature dependent. Such temperature related variation in gain may be problematic in imaging applications.

BRIEF DESCRIPTION

In one embodiment, a method is provided for calibrating gain in a radiation detector. The method comprises the act of measuring a dark current at each detector element of a detector assembly comprising an array of detector elements. A respective temperature corresponding to each measured dark current is determined. A breakdown voltage or a breakdown voltage compensation corresponding to each respective temperature is determined. A bias voltage is applied to the detector elements based on the breakdown voltage or the breakdown voltage compensation.

In a further embodiment, a method is provided for calibrating gain in a radiation detector. The method comprises the act of measuring a dark current at each detector element of a detector assembly comprising an array of detector elements. A breakdown voltage or a breakdown voltage compensation corresponding to each measured dark current is determined. A respective bias voltage is applied to each detector element based on the breakdown voltage or the breakdown voltage compensation determined for the respective detector element.

In an additional embodiment, an imaging system is provided. The imaging system comprises a detector panel comprising a plurality of silicon photomultipliers. Each silicon photomultiplier comprises an array of microcells. The imaging system further comprises control circuitry configured to apply a bias voltage to the microcells of each silicon photomultiplier. The control circuitry is configured to independently set the bias voltage applied to each silicon photomultiplier so as to maintain a constant over voltage. The bias voltage needed to obtain the constant over voltage is determined at least in part based on a respective dark current periodically measured at the respective silicon photomultiplier. The imaging system further comprises image reconstruction and processing circuitry configured to generate images based on output signals acquired from the detector panel and at least one image display workstation configured to display the images.

In another embodiment, a method is provided for determining a change in temperature at a radiation detector. The method comprises the act of measuring a dark current at each detector element of a detector assembly comprising an array of detector elements. A ratio of the dark current relative to a calibration dark current is determined. A temperature difference is determined based on the ratio. The temperature difference corresponds to the difference between the temperature when the calibration dark current was determined and when the dark current was measured.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
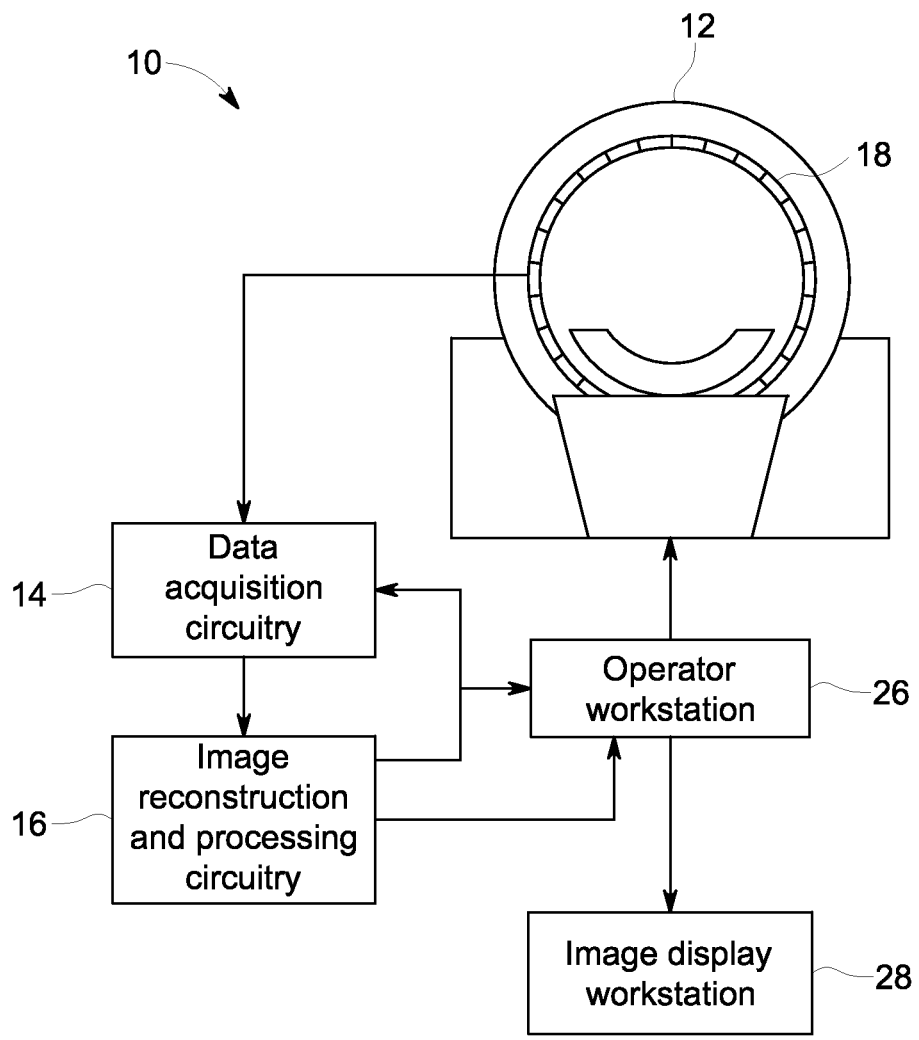
FIG. 1 is a diagrammatical representation of a PET imaging system in accordance with aspects of the present disclosure.

In accordance with the present disclosure, approaches for improving the usefulness of silicon photomultipliers (SiPM) in conjunction with radiation detection are described. As discussed herein, various radiation detection approaches exist that employ SiPMs incorporating an array of microcells (e.g., an avalanche photodiode (APD)) operating in Geiger mode. The breakdown voltage ($V_{br}$) of the microcell, depends on the temperature. For example, the typical temperature coefficient is about +30 to +60 mV/° C. for various APD structures. The SiPM works above the breakdown voltage in Geiger mode and the associated gain is proportional to the over voltage ($V_{ov}$). As a result, the gain at a given microcell depends at least in part on temperature due to the dependence of breakdown voltage on temperature. For a typical over voltage of 2 V, this translates to a gain temperature coefficient of approximately −2% to −3%/° C. However, knowledge of the amount of gain present in the SiPM at a given time may be necessary to determine the actual magnitude of the radiation incident on the detector. Thus, variations in gain due to temperature effects may lead to uncertainty with respect to the magnitude of the actual underlying event being measured.

To address the effects of temperature on gain, certain conventional approaches monitor the temperature of sensors and compensate the bias voltage ($V_{bias}$) to maintain constant over voltage. However, these conventional approaches employ temperature sensors separate from the SiPM but placed in proximity to the SiPM. As a result, the temperature sensors do not measure the actual temperature of the SiPM and, when fast temperature changes occur at the SiPM, there is a delay in this information being detected and acted upon.

In contrast to these conventional approaches, the present approach measures the dark current present in the SiPM and uses this measurement to estimate the temperature of the SiPM, thereby allowing for appropriate gain compensation. As will be appreciated, each SiPM device may generate "dark counts" or "dark current" in addition to those signals generated in response to incident radiation on the detector. The dark current signal is not generated in response to an impinging photon (i.e., a valid signal), but may instead arise due to the inherent electrical activity (i.e., noise) within the detector.

When the temperature of a SiPM changes, this temperature change has two effects on the observed dark current associated with the SiPM. First, the change in temperature of the SiPM changes the initial free charge generation rate (i.e., the dark count rate or DCR). Second the gain of the microcells (e.g., single photon avalanche diodes (SPADs) themselves changes, as noted above, due to the temperature dependent change in the breakdown voltage itself. Thus, the observed dark current is a product of the dark count rate and gain. As discussed herein, data acquired regarding the observed dark current may be used to determine the temperature of the SiPM, which may in turn be used to perform gain compensation for the SiPM. In practice, because the relationship between dark current and temperature and between gain and temperature may be initially empirically determined, the measured dark current may be directly used to determine the desired gain compensation, such as via a transfer function, without performing an intermediary calculation of temperature.

Due to variations in the manufacturing of the SiPM, the value of the dark current at a given temperature and bias voltage may vary from device to device. To first order, at a given temperature, the single photo electron (SPE) charge and the dark current change linear with respect to the bias voltage. Therefore it is often advantageous to use the fractional change in the dark current instead of the absolute change in the dark current when determining the change in the temperature.

With the foregoing in mind and turning now to the drawings, FIG. 1 depicts a PET system 10 operating in accordance with certain aspects of the present disclosure. Such a PET system 10 may be used in isolation or in conjunction with another imaging modality, such as a CT or MRI imaging system. Though a PET system 10 is described and discussed herein, it should be appreciated that the present approach may also be useful in other imaging contexts, such as in a SPECT imaging system or in an X-ray based imaging system, such as a mammography, fluoroscopy, computed tomography, tomosynthesis, or angiography system. Indeed, the present approach may be employed in conjunction with any nuclear radiation detector that is based on the use of scintillators with SiPM readout.

Returning now to FIG. 1, the depicted PET system 10 includes a detector assembly 12, data acquisition circuitry 14, and image reconstruction and processing circuitry 16. The detector assembly 12 of the PET system 10 typically includes a number of detector modules (generally designated by reference numeral 18) arranged about the imaging volume, as depicted in FIG. 1. As discussed herein the detector assembly 12, via the modules 18, may be configured to generate signals in response to gamma rays generated by positron annihilation events and emitted from a subject within the imaged volume. In certain implementations, the detector assembly 12 can include scintillators and photon detection electronics. The detector assembly 12 may be of any suitable construction and configuration for acquiring PET data. For example, as in the depicted example, the detector assembly 12 can be configured as a full or partial ring.

In certain implementations, gamma rays may be converted, such as in a scintillator of the detector assembly 12 or detector modules 18, to lower energy photons that in turn may be detected and converted in the detector modules 18 to electrical signals, which can be conditioned and processed to output digital signals. These output signals can be used to match pairs of gamma ray detections as potential coincidence events. That is, in such a PET implementation, when two gamma rays strike opposing detectors it may be determined that a positron annihilation occurred somewhere on the line connecting the two impact locations (absent the effects of interactions of randoms and scatter detections). In SPECT implementations, line of flight information may instead be inferred based at least in part on the collimation associated with the detector assembly. The collected data can be sorted and integrated and used in subsequent processing such as by image reconstruction and processing circuitry 16.

Thus, in operation, the detector acquisition circuitry 14 is used to read out the signals from the detector modules 18 of the detector assembly 12, where the signals are generated in response to gamma rays emitted within the imaged volume. The signals acquired by the data acquisition circuitry 14 are provided to the image reconstruction and processing circuitry 16. The image reconstruction and processing circuitry 16 generates an image based on the derived gamma ray emission locations. The operator workstation 26 is utilized by a system operator to provide control instructions to some or all of the described components and for configuring the various operating parameters that aid in data acquisition and image generation. The operating workstation 26 may also display the generated image. Alternatively, the generated image may be displayed at a remote viewing workstation, such as the image display workstation 28.

It should be appreciated that, to facilitate explanation and discussion of the operation of the PET system 10, the data acquisition circuitry 14 and the image reconstruction and processing circuitry 16 have been shown separately in FIG. 1 from other illustrated components (e.g., the detector assembly 12, the operator workstation 26, and the image display workstation 28). However, it should be appreciated that, in certain implementations, some or all of these circuitries may be provided as part of the detector assembly 12, the operator workstation 26, and/or the image display workstation 28. For example, the hardware, software, and/or firmware executed on or provided as part of the data acquisition circuitry 14, whether provided as part of the detector assembly 12, the operator workstation 26, and/or the image display workstation 28, may be used to perform various detector readout and/or control actions described herein. In certain implementations the data acquisition circuitry 14 may include specially configured or programmed hardware, memory, or processors (e.g., application-specific integrated circuits (ASICs)) for performing gain compensation as discussed herein. Similarly, certain of these compensation functions may be performed using one or more general or special purpose processors and stored code or algorithms configured to execute on such processors. Likewise, a combination of special purpose hardware and/or circuitry may be used in conjunction with one or more processors configured to execute stored code to implement the gain compensation steps discussed herein.

With this in mind, the detector technology in one implementation of a system such as that depicted in FIG. 1 will be discussed in greater detail. In particular, a PET or SPECT system may utilize arrays of solid-state photo sensors (as part of the gamma ray detection mechanism, e.g., as part of the detector modules 18. Such photo sensor devices may take the form, in certain implementations, of silicon photomultiplier (SiPM) devices, such as an array of passively quenched Geiger-mode avalanche photodiodes (APD) for detecting impinging photons. In general, SiPM devices used for photon detection can provide information about certain parameters, such as the time of the impingement event, the energy associated with the event, and the position of the event within the detector. These parameters can be determined through processing algorithms applied to the signals generated by the SiPM.

In one embodiment, a multichannel readout front-end application-specific integrated circuit (ASIC) interfaces with an array of SiPMs in a PET (or SPECT) system. The ASIC may be provided as part of the data acquisition circuitry 14 of FIG. 1 and may be configured to provide information on the timing, energy, and location of events in each SiPM to a processing system (e.g., processing circuitry 16), as well as the ability to bias each SiPM.

Figure 2:
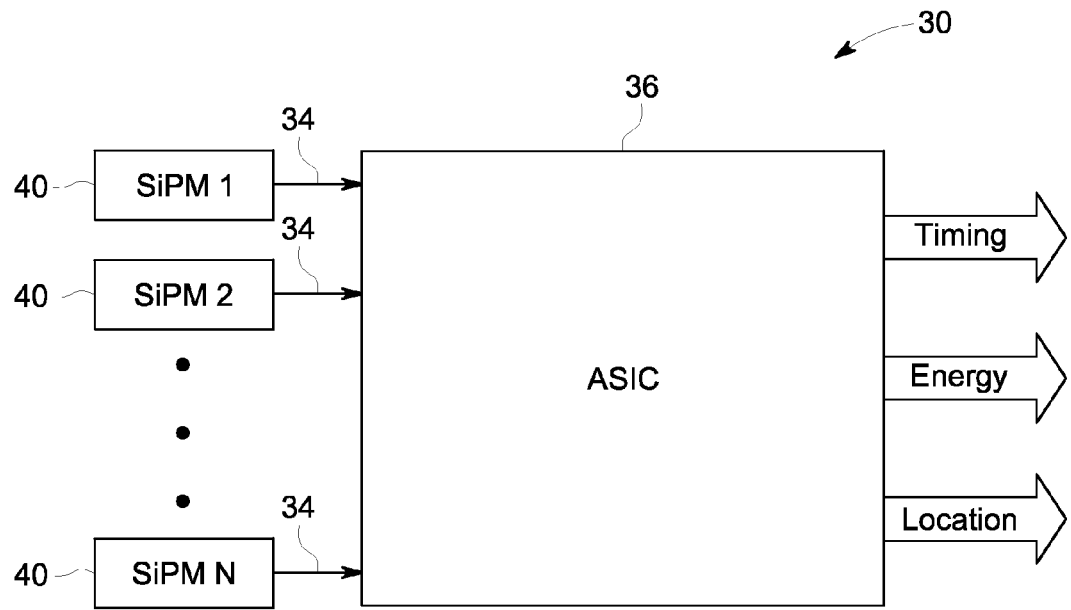
FIG. 2 is a block diagram of one example of a PET data acquisition system, in accordance with aspects of the present disclosure.

Turning to FIG. 2, a block diagram is depicted representing one example of a PET data acquisition system 30, such as may be used with the PET system 10 of FIG. 1. The PET data acquisition system 30 may include a plurality of SiPMs 40 as well as multiple ASICs 36 as part of the detector modules 18 and/or data acquisition circuitry 14. Light generated in a scintillator in response to a gamma ray interaction is detected by a SiPM and amplified. In this example, each SiPM 40 includes an anode output 34 in electrical communication with the ASIC 36. That is, the outputs of the SiPMs 40 are the inputs to the respective ASIC 36. The ASIC 36, in turn provides one or more timing signals, energy signals, and/or position signals as outputs. Each of these signals output by the ASIC 36 corresponds to information obtained from the respective SiPMs 40 after processing by the ASIC 36. By way of a non-limiting example, in one embodiment, a data acquisition system 30 can include eighteen (18) SiPMs 40. However, in other implementations, other quantities of SiPMs 40 may be present within a data acquisition system 30.

Figure 3:
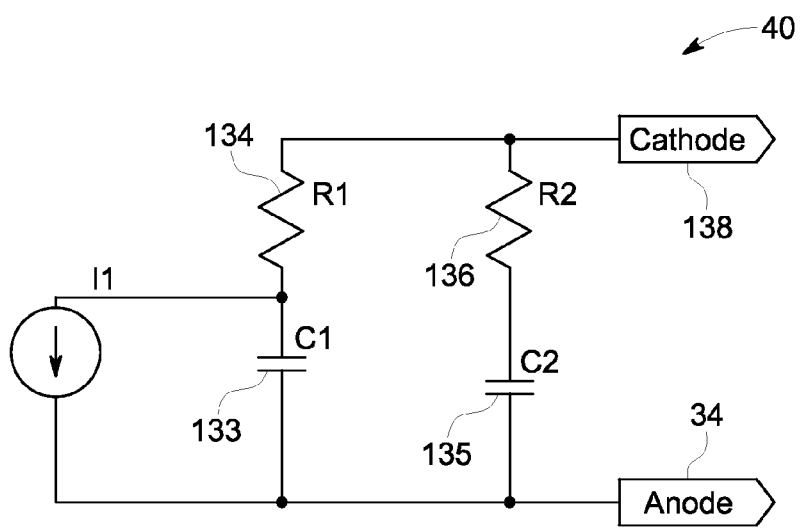
FIG. 3 depicts a simplified electrical model of one example of a SiPM circuit, in accordance with aspects of the present disclosure.

Turning to FIG. 3, an example of a simplified electrical model of the circuit of the SiPM 40 of FIG. 2 is depicted. In this example, the SiPM 40 has an anode output, which as noted with respect to FIG. 2, can provide an input for the ASIC 36. C1 133 and R1 134 are respectively the modeled capacitance of the APD as well as a quenching resistor for the microcell 46 depicted in FIG. 4 which detects the photon. C2 135 and R2 136 are the equivalent capacitor and resistor of all the other microcells in the SiPM.

Figure 4:
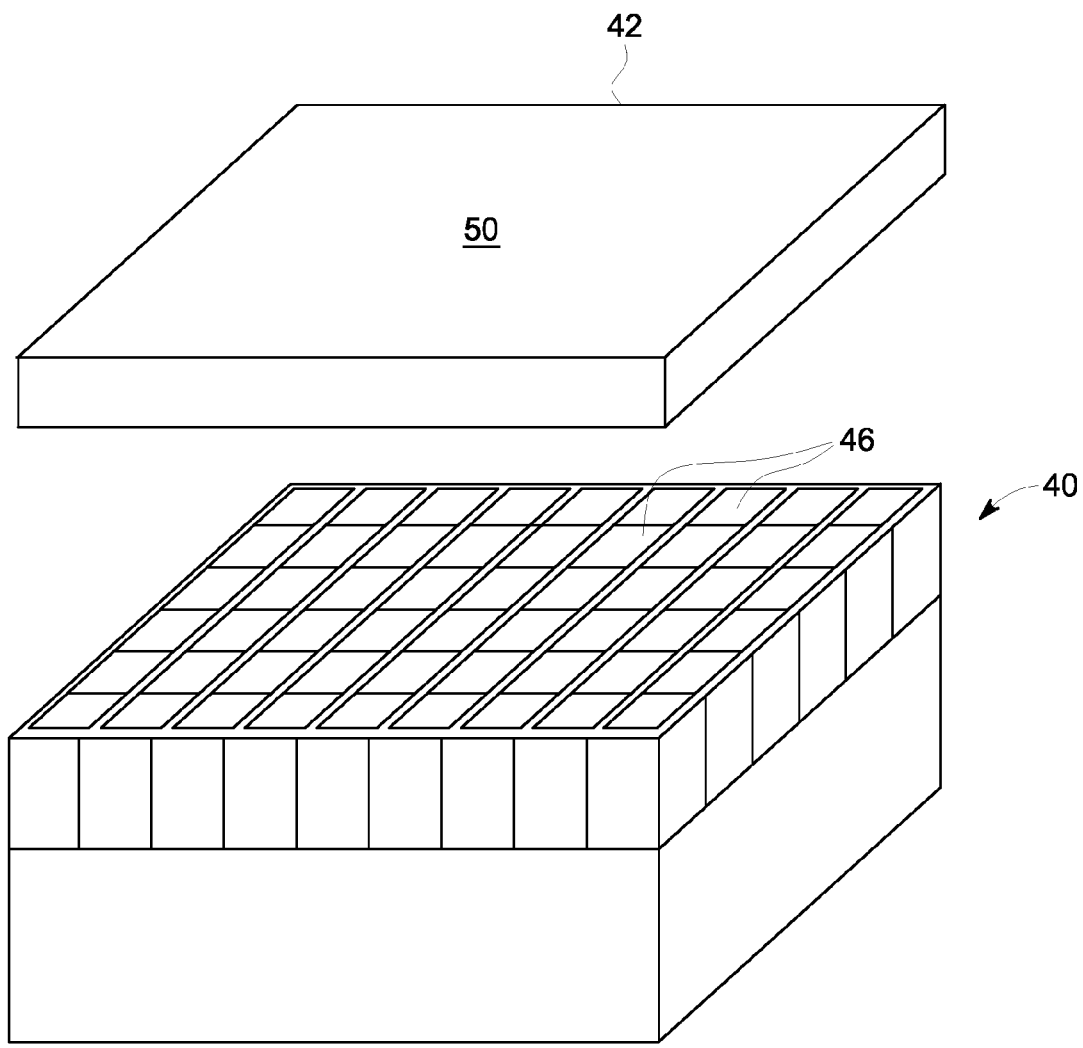
FIG. 4 depicts a perspective view of a detector SiPM, in accordance with aspects of the present disclosure.

In certain implementations, each SiPM 40 is formed using a silicon as semiconductor material, although other suitable materials could instead be used. As discussed herein each SiPM 40 comprises a plurality of macroscopic units, referred to as microcells 46. By way of illustration, a single SiPM 40 is shown in FIG. 4. The number of microcells 46 on a SiPM 40 is typically sufficient to effectively cover an area of the SiPM 40. Typically the area of a SIPM 40 is sufficient to cover one or more crystal elements 50 formed on the scintillator 42. However, it should be appreciated that the exact number and density of the SiPMs will be determined by the image resolution desired by an operator and other known factors.

As depicted in FIG. 4, a single SiPM 40 is comprised of a plurality of avalanche photodiodes (APDs) or "microcells" 46 that amplify single optical photon arrivals from the scintillator 42 into an output signal. Typically, each SiPM will contain a large number of microcells 46 (e.g., between 100 to 2,500 APDs per $mm^2$) In one implementation, each of the microcells 46 operates as an individual Geiger-mode APD, with each microcell 46 being virtually identical to all the other microcells. In this mode of operation, an electron or a hole generated by the absorption of an optical photon initiates an avalanche breakdown that is confined to an individual microcell 46 when the one or more photons is absorbed by that microcell 46. Each microcell 46 functions independently of the others to detect photons. In one embodiment, the microcells are electrically connected in parallel to yield an integrated charge over some area over which the signals are being aggregated, such as a SiPM 40.

The summed discharge currents of the microcells 46 are indicative of the incidence of radiation over a given area. This output is capable of providing magnitude information regarding the incident photon flux over the area for which signals are being aggregated. It should be appreciated that, to facilitate explanation and discussion of the operation of detector modules 18, the SiPM 40 has been described as containing a single area over which the signals are aggregated (e.g., via a single anode 34), however in at least some implementations, the detector module may use monolithic silicon devices which contain multiple SiPMs which have a common cathode 138 and separated anodes 34.

As noted above, such SiPM device may also generate "dark counts" or a "dark current", where a signal is detected that is not in response to an impinging photon, but may instead be due to the inherent electrical activity (i.e., free charge creation) within the device. Further, as noted above, the number of dark counts generated by a SiPM depends on the temperature of the SiPM. By way of example, in certain instances the typical temperature dependence of the dark count rate (DCR) is exponential and doubles each 7 to 8 degree Celsius. This may correspond to dark count rate change of 9% to 10%/° C. Signal gain, such as at the microcell level, also is temperature dependent and depends on the over voltage $V_{ov}$ and may exhibit a gain temperature coefficient of −3%/° C. to −4%/° C. (for $V_{ov}$ between 1.5 V and 2 V). As result of these two opposing trends, in certain embodiments the expected dark current temperature coefficient will be between 5% to 7%/° C.

In the example of PET detectors, this dark current shifts the measurement baseline and can be measured between scintillation pulses (i.e., when there is no radiation to be measured incident on the detector). That is, by reading out a detector module 18 (or SiPM 40) when there is no radiation incident on the respective detector module 18 or SiPM 40, a measure of the dark current can be obtained at that time. Based on the measured dark current, the temperature of the SiPM 40 may be determined and used for gain compensation purposes. In embodiments where the readout circuit produces an offset current in addition to the dark current, this offset current may be measured by setting the SiPM's bias voltage to a voltage less than the breakdown voltage. The measured circuit offset current can then be subtracted from offsets measured when the bias voltage is above the breakdown voltage to give the dark current from the SiPM.

Figure 5:
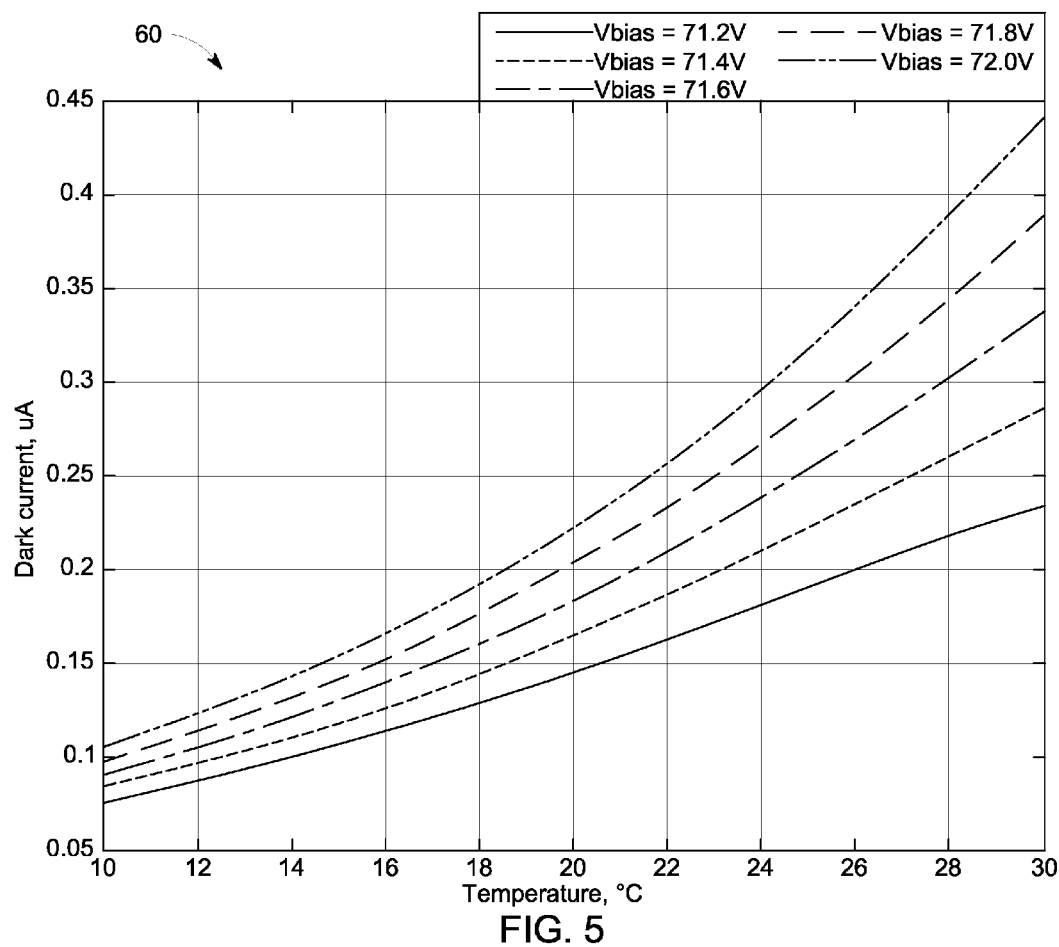
FIG. 5 is a graph showing the relationship between dark current, temperature, and bias voltage, in accordance with aspects of the present disclosure.
Figure 6:
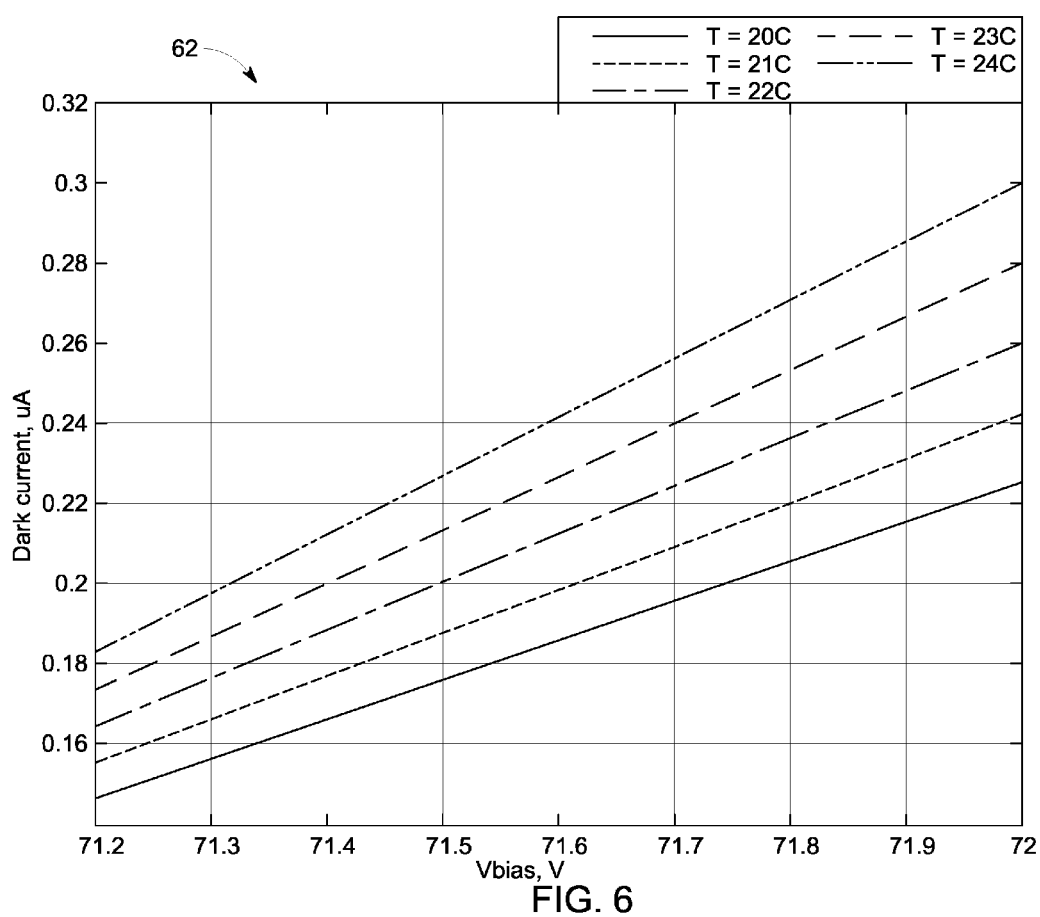
FIG. 6 is another graph showing the relationship between dark current, temperature, and bias voltage, in accordance with aspects of the present disclosure.
Figure 7:
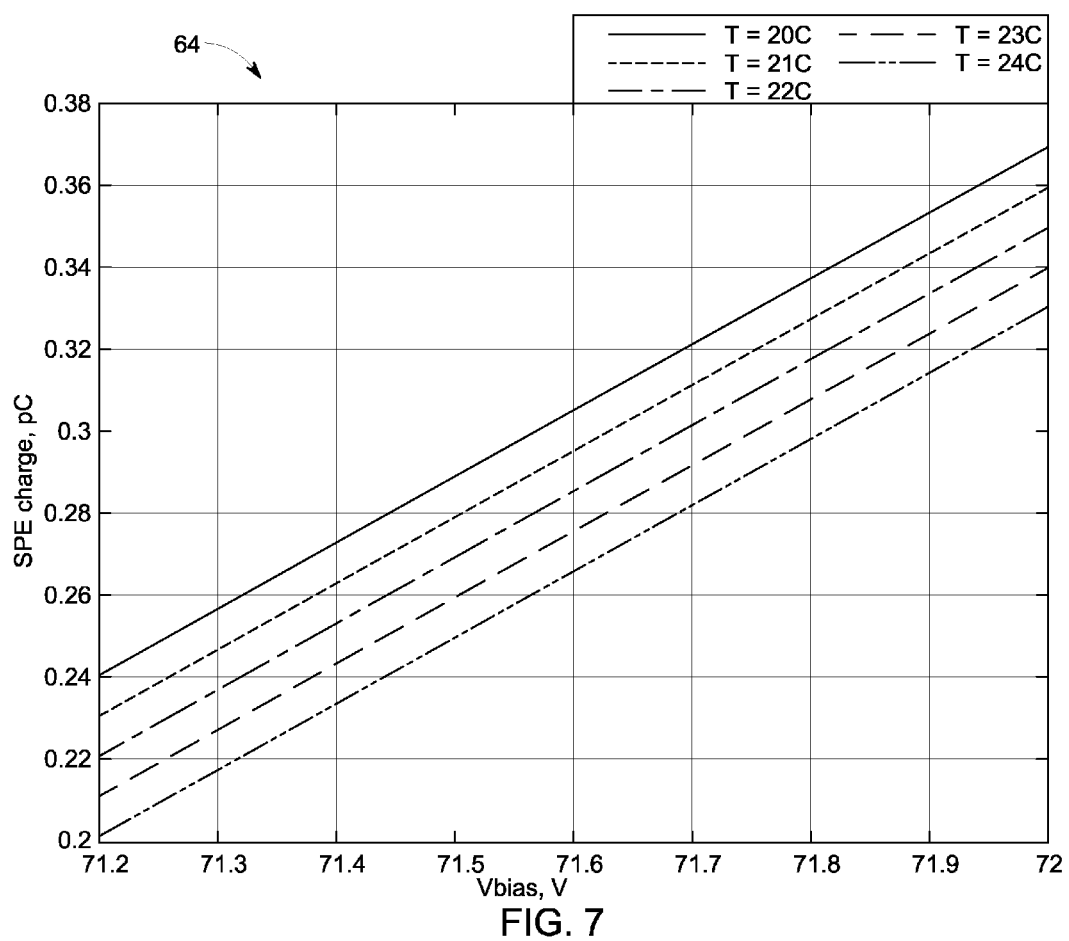
FIG. 7 is a graph showing the relationship between gain, temperature, and bias voltage, in accordance with aspects of the present disclosure.

For example, turning to FIGS. 5-7, a series of graphs are depicted demonstrating the relationships noted above. To estimate temperature effects on dark current a model was employed. In particular, dark count rate was modeled as 1 Mcps at 25° C., doubling for every 7° C. increase. The breakdown voltage ($V_{br}$) was modeled as being 70V at 25° C., increasing 60 mV for every a 1° C. increase in temperature of the SiPM 40. Single photon electron (SPE) gain was modeled as $1 \times 10^6$ when the over voltage ($V_{ov}$) is 1 V and the value of C1 133 is 160 fF.

With these modeling parameters in mind, FIG. 5 depicts the relationship between temperature and dark current (measured in μA) as a function of the bias voltage ($V_{bias}$) applied to the SiPM 40 (here depicted in increments between 71.2 V and 72 V). As depicted, as temperature increases, the dark current increases at each $V_{bias}$ modeled.

Similarly, FIG. 6 depicts the relationship between voltage bias ($V_{bias}$) and dark current (measured in μA) as a function of temperature of the SiPM 40 (here depicted in increments between 20° C. and 24° C. As noted with respect to FIG. 5, for a given bias voltage, it can be seen that observed dark current increases as temperature increases.

Thus, as shown in FIGS. 5 and 6 for a given bias voltage, there is a relationship between temperature of the SiPM 40 and the observed dark current in the SiPM 40. As a result, for a given bias voltage and an observed dark current, the temperature of a given SiPM 40 can be determined. As noted above, this temperature can then be used to determine the breakdown voltage change of the SiPM 40 at a given point in time.

For example, turning to FIG. 7, this figure graphically depicts the gain model versus temperature. In particular, FIG. 7 depicts the relationship between voltage bias ($V_{bias}$) and single photo electron (SPE) charge (measured in pC) as a function of temperature of the SiPM 40 (here depicted in increments between 20° C. and 24° C. As depicted, for a given bias voltage, it can be seen that the gain for a single photo electron event decreases as temperature increases. Thus, by knowing the temperature of the SiPM 40, one may also know the associated gain seen at the SiPM 40 for each photo electron event, and can calibrate the response seen at the SiPM accordingly.

Figure 8:
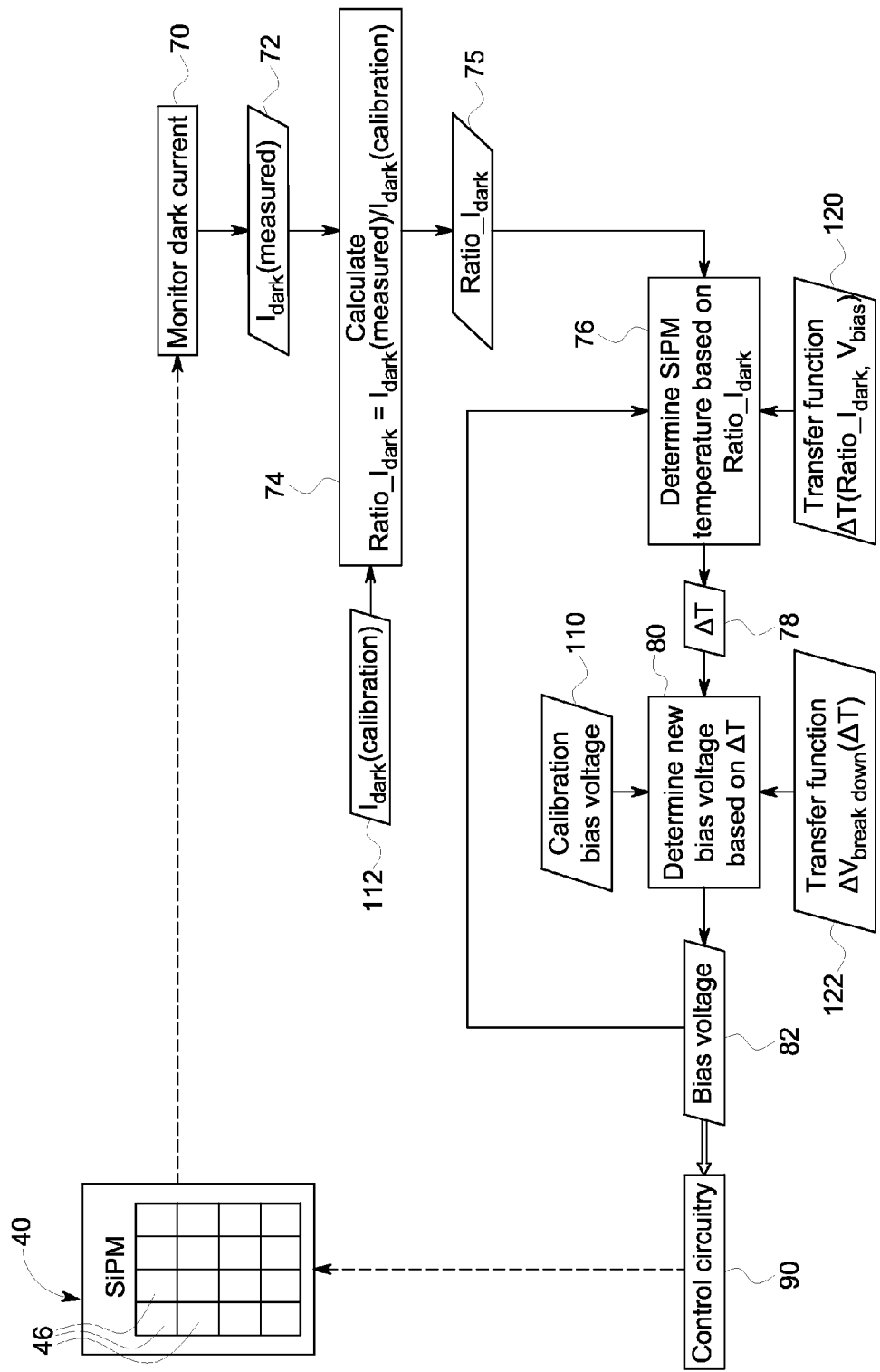
FIG. 8 is flow diagram depicting one implementation of performing gain adjustment using measured dark current, in accordance with aspects of the present disclosure.

With the preceding discussion in mind, FIG. 8 depicts an example of a process flow by which a measured dark current for a photosensor element is used to perform gain compensation for the element. In this example, the detector element is a SiPM 40 that may be part of a detector module 18 or other detector component of an imaging system. The depicted SiPM 40 includes a number of microcells 46 that each operate independent of one another and in parallel to one another. By way of example, the microcells 46 may be avalanche photodiodes (APDs). In this example, the dark current 72 of SiPM 40 may be monitored (block 70) during intervals when no radiation is incident on the SiPM 40. Based on this periodic monitoring, a dark current 72 may be determined for the SiPM 40 at regular intervals during an imaging operation. The ratio 75 of the measured dark current 72 and the dark current 112 measured at the time the detector's gain was initially calibrated is calculated 74.

As discussed herein, in view of the relationship between dark current and temperature, the measured ratio of dark currents 75 may be used to determine (block 76) the difference 78 between the SiPM's present temperature and its temperature when the detector was originally calibrated. By way of example, the delta temperature 78 may be derived for each SiPM 40 using the measured dark current ratios 75 by reference to a look-up table or by use of a derived formula 120 that yields temperature based on an input dark current ratio and bias voltage. In the example above, the ratio of dark currents 75 are first calculated and then used as inputs to the look-up table. However, the division by the calibration dark current can be incorporated in the look-up table or transfer function and the measured dark current 72 used instead as the input to the modified look-up table or transfer function.

Once the delta temperatures 78 are known, the respective bias voltage (or needed bias voltage compensation 82) may be determined (block 80) at each SiPM 40. As with the delta temperature 78, the bias voltage or bias voltage compensation 82 may be determined by reference to a look-up table or by use of a derived formula. For example, in the depicted implementation, a transfer function 122 that utilizes the ΔT 78 and a known calibration bias voltage 110 to derive bias voltage 82 may be utilized.

Based on the calculated bias voltage or bias voltage compensation 82, the bias voltage ($V_{bias}$) applied to the microcells 46 of the SiPM 40 via control circuitry 90 may be adjusted so as to maintain a constant over voltage ($V_{ov}$) for each SiPM 40. The bias voltage applied to each SiPM 40 may be controlled on an element-by-element basis such that each SiPM 40 is gain calibrated independent of the others.

Figure 9:
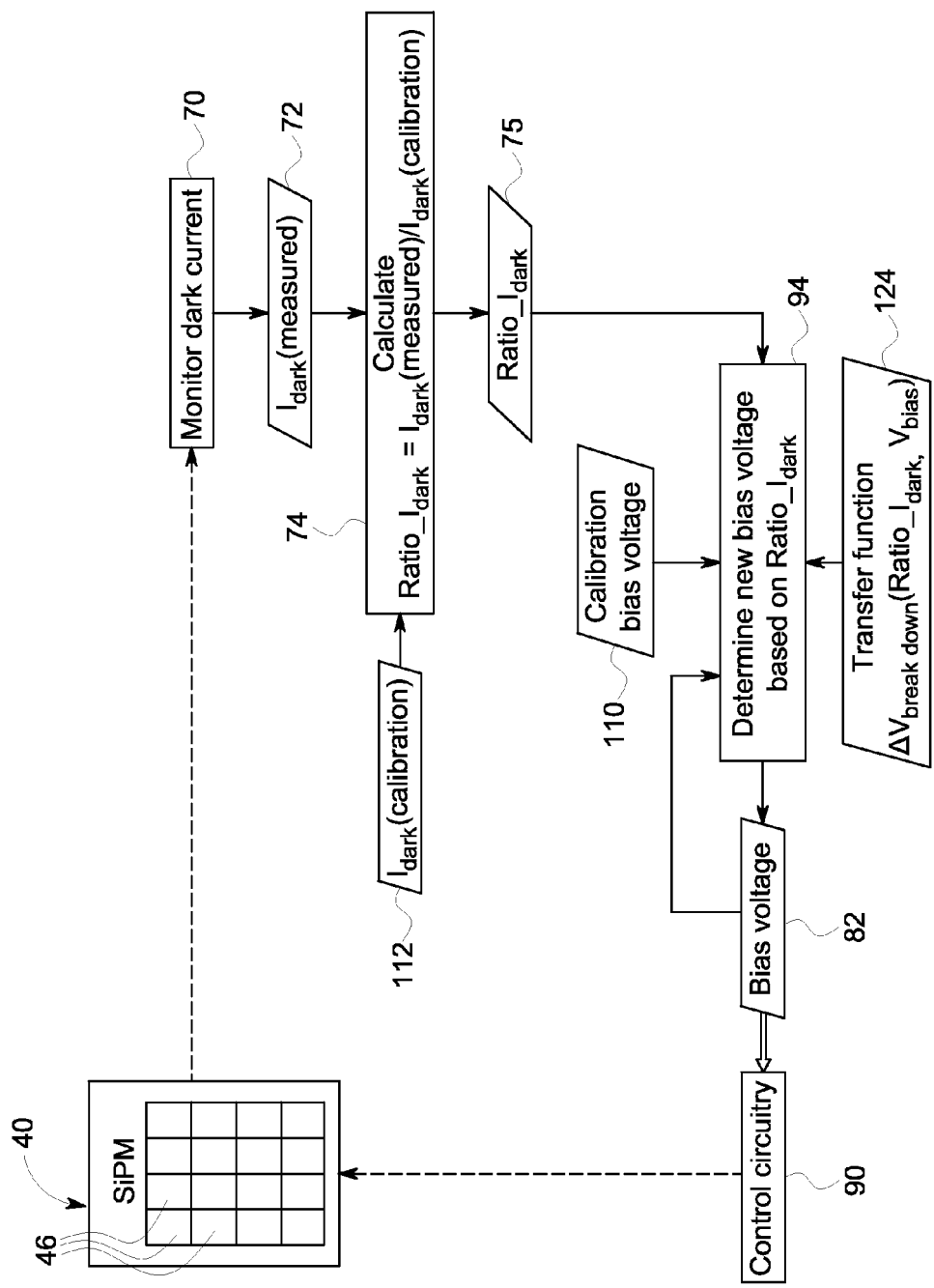
FIG. 9 is flow diagram depicting another implementation of performing gain adjustment using measured dark current, in accordance with aspects of the present disclosure.

Turning to FIG. 9, an alternative implementation is described. In this example, a transfer function 124 is provided that algorithmically formulates the relationship of temperature with respect to the measured dark currents 72 and the desired bias voltage or bias voltage compensation 82. Thus, upon measuring the dark current 72 for a SiPM 40, the transfer function 124 may be accessed (block 94) using the measured dark current ratio 75 to determine the corresponding bias voltage or bias voltage compensation 82. Thus, in this implementation, the delta temperature 78 may not be explicitly calculated as the temperature relationships are instead captured in the transfer function 124, allowing the use of dark current ratio 75 to directly determine the needed bias voltage compensation 82.

Figure 10:
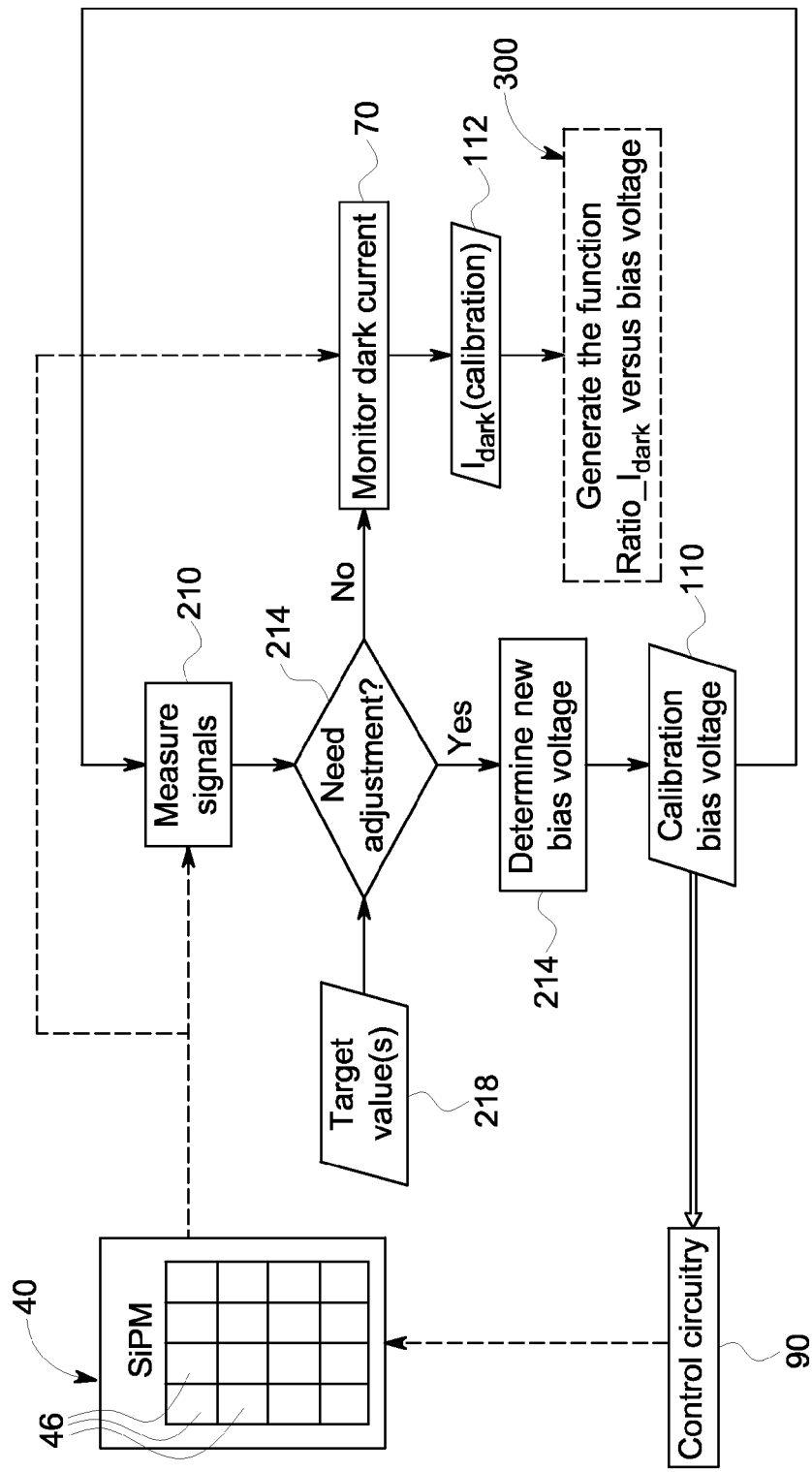
FIG. 10 is flow diagram depicting the gain calibration of the scanner, in accordance with aspects of the present disclosure.

FIG. 10 depicts an example of a process flow by which the parameters calibration bias voltage 110 and calibration dark current 112 can be determined. The output signal from the SiPM is measured (block 210) when a gamma photon interacts with a scintillator crystal and the signal value is compared (block 214) to a predetermined target value 218. If the measured value and target value differ by more than a predetermined amount, a new calibration bias voltage value 110 is determined (block 214). The new bias voltage is applied to the SiPM 40 by the control circuit 90 and the above steps are repeated until no further adjustments are required. The dark current signal from the SiPM 40 is then measured 70 and saved as the calibration dark current 112. The process to measure (block 300) the dark current as a function of bias voltage, shown in FIG. 11, can then be executed. In the described implementation, the detector gain is calibrated by comparing the measured gamma ray signal to a target value 218, but it could also be calibrated by various other suitable approaches. Regardless of the approach, the calibration dark current 112 produced in response to calibration bias voltage 110 is measured when the SiPM temperature it was at when the calibration bias voltage was determined.

Figure 11:
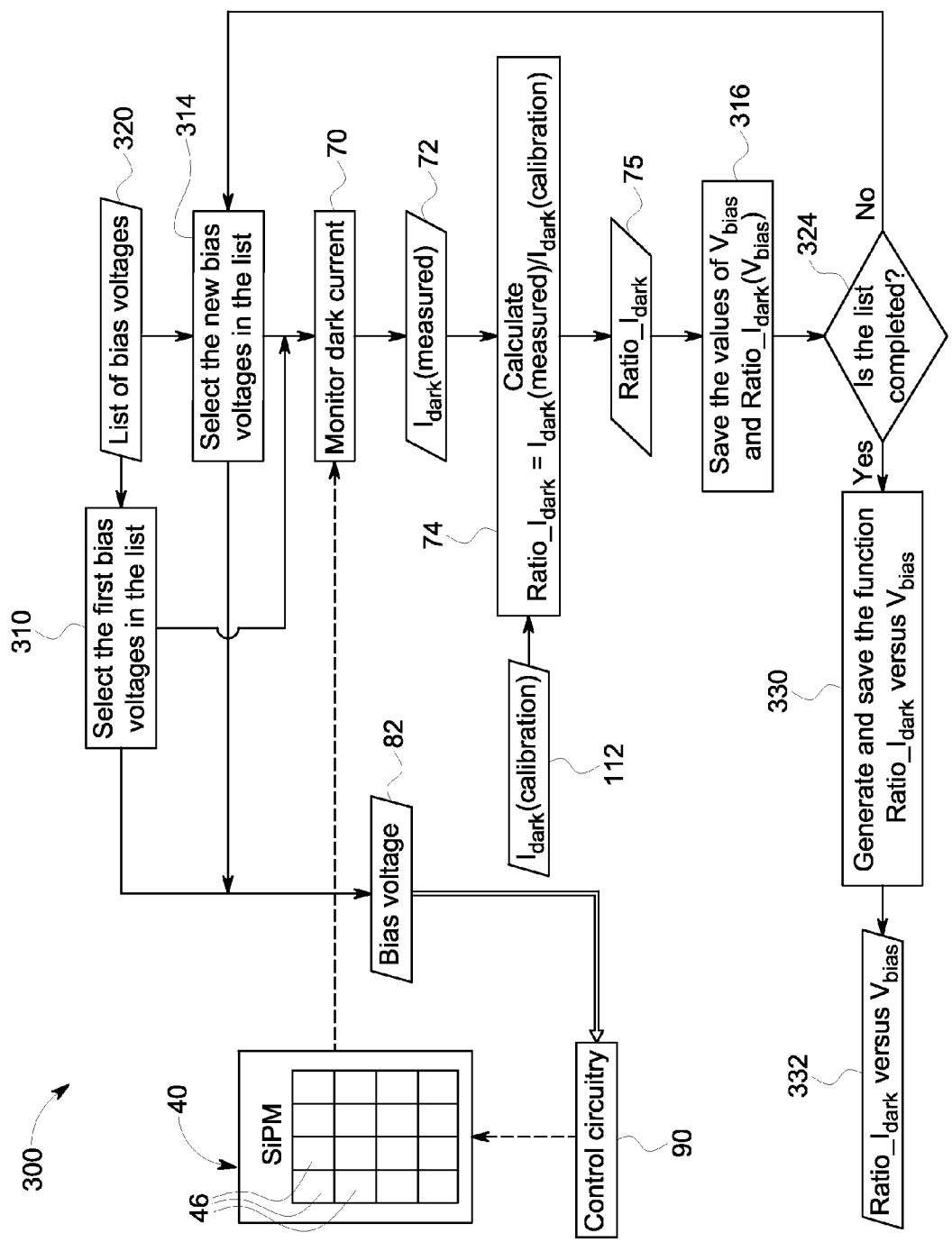
FIG. 11 is flow diagram depicting the measurement of the ratio of dark currents versus bias voltages, in accordance with aspects of the present disclosure.

FIG. 11 depicts an example of a process flow 300 by which the function of the dark current ratio as a function of the SiPM bias voltage can be determined (block 330). The first bias voltage 82 in a predetermined list of bias voltages 320 is selected (block 310) and applied to the SiPM 40 by the control circuit 90. The signal from the SiPM is then used to determine (block 70) the measured dark current 72 produced by the selected bias voltage. The dark current ratio 75 is calculated (block 74) from the measured dark current 72 and the calibration dark current 112. The values of the applied bias voltage 82 and resulting dark current 112 are then saved (block 316). The location of the applied voltage 82 in the bias voltage list 320 is determined. If the present applied voltage is not the last voltage in the list 320 (as determined at decision block 324), the next bias voltage value in the list is selected (block 314) and the above steps repeated. If the applied voltage is the last value in the list 320 (as determined at decision block 324), the saved pairs of bias voltages 82 and the corresponding dark currents 72 produced by them are used to generate (block 330) the function 332 of dark current ratios versus SiPM bias voltage.

If the process 300 is done in close temporal proximity to the calibration process shown in FIG. 10, the resulting function 332 will correspond to the temperature of the SiPM when the gain calibration was performed. The model of the dark current dependence on SiPM temperature used to derived curves in FIG. 6, FIG. 7, and FIG. 8 with the measured function 332 of dark current ratio versus bias voltage can be used to determine the transfer function 120 of dark current ratio to change in SiPM temperature. Alternatively, the process shown in FIG. 11 can be repeated at different SiPM temperatures and the transfer function 120 can be directly measured.

Technical effects of the invention include, but are not limited to, the use of a measured dark current to determine the temperature of a radiation detector or detector element. Alternatively, technical effects of the invention include the determination of a gain or gain compensation for a detector or detector element using the measured dark current. Bias voltage of the detector or detector elements is thus adjusted directly or indirectly based upon measured dark currents. The change in the temperature of the detector or detector element is determined without external or explicit temperature sensors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for calibrating gain in a radiation detector, comprising the acts of:
   measuring a dark current generated by each silicon photomultiplier of an imaging detector comprising an array of silicon photomultipliers;
   determining a respective temperature corresponding to each measured dark current of each silicon photomultiplier;
   determining a respective bias voltage as a function of the determined respective temperature required to maintain a constant over voltage for each silicon photomultiplier; and
   applying the bias voltage to each silicon photomultiplier.

2. The method of claim 1, wherein each of the silicon photomultipliers comprise microcells, the microcells comprising avalanche photodiodes.

3. The method of claim 1, wherein the dark current is measured during a period when radiation is not incident on the silicon photomultiplier.

4. The method of claim 1, wherein the respective temperature is determined by accessing a look up table or solving a formula using the respective measured dark current and a contemporaneous bias voltage applied to the respective silicon photomultiplier.

5. The method of claim 1, wherein the respective breakdown voltage or breakdown voltage compensation is determined by accessing a look up table or solving a formula using the respective temperature and a contemporaneous bias voltage applied to the respective silicon photomultiplier.

6. The method of claim 1, wherein the dark current is provided via read out circuitry of each respective silicon photomultiplier.

7. A method for calibrating gain in a radiation detector, comprising the acts of:

measuring a dark current generated by each silicon photomultiplier of an imaging detector comprising an array of silicon photomultipliers;

determining a respective bias voltage as a function of the measured dark current required to maintain a constant over voltage for each silicon photomultiplier; and applying the bias voltage to each silicon photomultiplier.

8. The method of claim 7, wherein each of the silicon photomultipliers comprise an array of microcells.

9. The method of claim 8, wherein the microcells comprise avalanche photodiodes.

10. The method of claim 7, wherein the dark current is measured during a period when radiation is not incident on the respective silicon photomultiplier.

11. The method of claim 7, wherein the breakdown voltage or breakdown voltage compensation is determined by accessing a look up table or solving a formula using the respective measured dark current and a contemporaneous bias voltage applied to the respective silicon photomultipliers.

12. The method of claim 11, wherein the look up table or formula comprise a transfer function that relates temperature, gain, and bias voltage with respect to the silicon photomultipliers.

13. The method of claim 7, wherein the dark current is provided via read out circuitry of each respective silicon photomultiplier.

14. An imaging system, comprising:

an imaging detector comprising a plurality of silicon photomultipliers, wherein each silicon photomultiplier comprises an array of microcells;

control circuitry configured to apply a bias voltage to the microcells of each silicon photomultiplier, wherein the control circuitry is configured to independently set the bias voltage applied to each silicon photomultiplier so as to maintain a constant over voltage, and wherein the bias voltage needed to obtain the constant over voltage is determined at least in part based on a respective dark current periodically generated by each respective silicon photomultiplier;

image reconstruction and processing circuitry configured to generate images based on output signals acquired from the detector panel; and at least one image display workstation configured to display the images.

15. The imaging system of claim 14, wherein the imaging system is configured to:

periodically measure the dark current generated by each silicon photomultiplier;

determine a respective temperature corresponding to the measured dark current;

determine a respective bias voltage as a function of the determined respective temperature required to maintain a constant over voltage for each silicon photomultiplier.

16. The imaging system of claim 15, wherein the respective temperature is determined by accessing a look up table or solving a formula using the respective measured dark current and a contemporaneous bias voltage applied to the respective silicon photomultiplier.

17. The imaging system of claim 15, wherein the respective gain or gain compensation is determined by accessing a look up table or solving a formula using the respective temperature and a contemporaneous bias voltage applied to the respective silicon photomultiplier.

18. The imaging system of claim 14, wherein the imaging system is configured to:

periodically measure the dark current generated by each silicon photomultiplier;

determine a respective bias voltage as a function of the determined respective temperature required to maintain a constant over voltage for each silicon photomultiplier.

19. The imaging system of claim 18, wherein the respective breakdown voltage or breakdown voltage compensation is determined by accessing a look up table or solving a formula using the respective measured dark current and a contemporaneous bias voltage applied to the respective silicon photomultiplier.

20. A method for determining a change in temperature at a radiation detector, comprising the acts of:

measuring a dark current generated by each silicon photomultiplier of an imaging detector comprising an array of silicon photomultipliers;

determining a ratio of the dark current relative to a calibration dark current; and determining a temperature difference based on the ratio, wherein the temperature difference corresponds to the difference between the temperature when the calibration dark current was determined and when the dark current was measured.

21. The method of claim 20, further comprising determining a bias voltage or bias voltage compensation based upon the temperature difference.

22. The method of claim 20, wherein the temperature difference is determined by accessing a look up table or solving a formula using the respective measured dark current or ratio.

23. The method of claim 20, wherein the dark current is provided via read out circuitry of each respective silicon photomultiplier.

* * * * *